US008892120B2

(12) United States Patent
Shrestha et al.

(10) Patent No.: US 8,892,120 B2
(45) Date of Patent: Nov. 18, 2014

(54) METHODS IN A WIRELESS COMMUNICATION SYSTEM FOR CRIME INVESTIGATION, EVIDENCE GENERATION AND ANALYSIS

(75) Inventors: Ajit Shrestha, West Melbourne, FL (US); Ivica Kostanic, Palm Bay, FL (US); Kamran Kashi, Melbourne Beach, FL (US)

(73) Assignee: Gladiator Innovations, LLC, Melbourne, FL (US)

( * ) Notice: Subject to any disclaimer, the term of this patent is extended or adjusted under 35 U.S.C. 154(b) by 0 days.

(21) Appl. No.: 13/324,967

(22) Filed: Dec. 13, 2011

(65) Prior Publication Data

US 2013/0150074 A1    Jun. 13, 2013

(51) Int. Cl.
*H04W 64/00*    (2009.01)

(52) U.S. Cl.
USPC ...... 455/456.1; 455/423; 455/525; 455/456.2

(58) Field of Classification Search
USPC ............................ 455/456.1, 423, 525, 456.2
See application file for complete search history.

(56) References Cited

U.S. PATENT DOCUMENTS

| | | | |
|---|---|---|---|
| 6,202,068 | B1 | 3/2001 | Kraay et al. |
| 6,987,845 | B1 | 1/2006 | Van Natter et al. |
| 6,999,777 | B1 | 2/2006 | Ganesh |
| 7,646,312 | B2 | 1/2010 | Rosen |
| 7,764,231 | B1 | 7/2010 | Karr et al. |
| 2006/0184373 | A1 | 8/2006 | Kumhyr |
| 2007/0117572 | A1 | 5/2007 | Adam et al. |
| 2007/0165802 | A1 | 7/2007 | Fox |
| 2008/0081638 | A1 | 4/2008 | Boland et al. |
| 2008/0167049 | A1 | 7/2008 | Karr et al. |
| 2010/0151820 | A1 | 6/2010 | Mulherin et al. |
| 2010/0176949 | A1 | 7/2010 | Emigh et al. |

FOREIGN PATENT DOCUMENTS

| | | |
|---|---|---|
| JP | 2008103907 | 5/2008 |
| KR | 100868257 | 11/2008 |

OTHER PUBLICATIONS

JP2008103907 English translation.*
Vertical Mapper; Version 3.7 User Guide; Pitney Bowes; 2009; 213 pp.
Vertical Mapper; Version 3.5 User Guide; Pitney Bowes; 2008; 209 pp.
Safe and Unsafe Use of Mobile Phone Evidence; Coutts et al.; Public Defenders Criminal Law Conference; 2009; 11 pp.

* cited by examiner

*Primary Examiner* — Jinsong Hu
*Assistant Examiner* — Jean Chang
(74) *Attorney, Agent, or Firm* — Wells St. John P.S.

(57) ABSTRACT

Crime investigation methods, evidence generation methods, and wireless communications system analysis methods are described. According to one aspect, a crime investigation method includes receiving information regarding a commission of a crime at a time period of interest and at a geographic location of interest, after the receiving and using wireless communications analysis equipment, measuring cellular signals in a geographic area which includes the geographic location of interest during the time period of interest, as a result of the measuring, generating measurement data which is indicative of a parameter of the cellular signals in the geographic area, using the measurement data, calculating a wireless coverage representation for the geographic area and which includes the geographic location of interest, accessing cellular communications records which are indicative of communications via the cellular signals in the geographic area, and using the cellular communications records and the wireless coverage representation, providing information regarding the crime.

23 Claims, 3 Drawing Sheets

METHODS IN A WIRELESS COMMUNICATION SYSTEM FOR CRIME INVESTIGATION, EVIDENCE GENERATION AND ANALYSIS

TECHNICAL FIELD

This disclosure relates to crime investigation methods, evidence generation methods, and wireless communications system analysis methods.

BACKGROUND OF THE DISCLOSURE

Some wireless communications networks (e.g., cellular networks) typically comprise a set of base stations, each having one or more sectors. Each sector includes radios and an antenna that transmits and receives wireless communications signals within a particular geographic area. The size and location of the geographic area with coverage of a given sector is defined by various factors such as the radiation pattern (including directionality) of the antenna, the positioning of the antenna (e.g., height, orientation, and tilt of the antenna), and the power level transmitted by the antenna. The geographic area served by a sector is commonly referred to as a cell and/or a coverage area.

The present disclosure describes various methods, apparatus and systems for determining wireless coverage representations of wireless communications sources with respect to geographic locations and different example applications of use of the determined wireless coverage representations.

BRIEF DESCRIPTION OF THE DRAWINGS

Exemplary embodiments of the disclosure are described below with reference to the following accompanying drawings.

DETAILED DESCRIPTION OF THE DISCLOSURE

As described below, some aspects of the disclosure are directed to methods, apparatus and systems for determining wireless coverage representations of wireless communications sources (e.g., sectors of one or more base stations of a wireless communications network) with respect to geographical locations. The determined wireless coverage representations (e.g., footprint maps) may indicate which wireless communications source that a mobile communications device (e.g., cellular telephone, smartphone, etc.) is most likely to communicate with when the device is positioned at one of the geographical locations within the representation. The disclosure describes different applications and uses of the determined wireless coverage representations according to different embodiments.

According to one embodiment, a crime investigation method includes receiving information regarding a commission of a crime at a time period of interest and at a geographic location of interest, after the receiving and using wireless communications analysis equipment, measuring cellular signals in a geographic area which includes the geographic location of interest during the time period of interest, as a result of the measuring, generating measurement data which is indicative of a parameter of the cellular signals in the geographic area, using the measurement data, calculating a wireless coverage representation for the geographic area and which includes the geographic location of interest, accessing cellular communications records which are indicative of communications via the cellular signals in the geographic area, and using the cellular communications records and the wireless coverage representation, providing information regarding the crime.

According to an additional embodiment, an evidence generation method includes identifying a geographic location of interest, identifying a time period of interest, using wireless communications analysis equipment, measuring wireless communications signals emitted from at least one fixed-position wireless communications source of a wireless communications network in a geographic area which includes the geographic location of interest, as a result of the measuring, generating measurement data which is indicative of a parameter of the wireless communications signals in the geographic area during the time period of interest, using the measurement data, generating a wireless coverage representation identifying a fixed-position communications source with respect to the geographic location of interest, and using the wireless coverage representation as evidence with respect to wireless communications of the wireless communications network at the geographic location of interest during the time period of interest.

According to another embodiment, a wireless communications system analysis method includes identifying a geographic area of interest to analyze wireless communications of a wireless communications system, during a time period of interest, enabling wireless communications analysis equipment, during the time period of interest, moving the enabled wireless communications analysis equipment throughout the geographic area of interest to analyze the wireless communications system, during the moving, measuring wireless communications signals emitted from a plurality of fixed-position communications sources of the wireless communications system at different geographic locations within the geographic area of interest, as a result of the measuring, generating measurement data which is indicative of a parameter of the wireless communications signals at the different geographic locations within the geographic area of interest during the time period of interest, communicating the measurement data to a remote computing device, and using the remote computing device, generating a wireless coverage representation from the measurement data which identifies a plurality of the fixed-position communications sources for different regions of the geographic area of interest.

Figure 1:
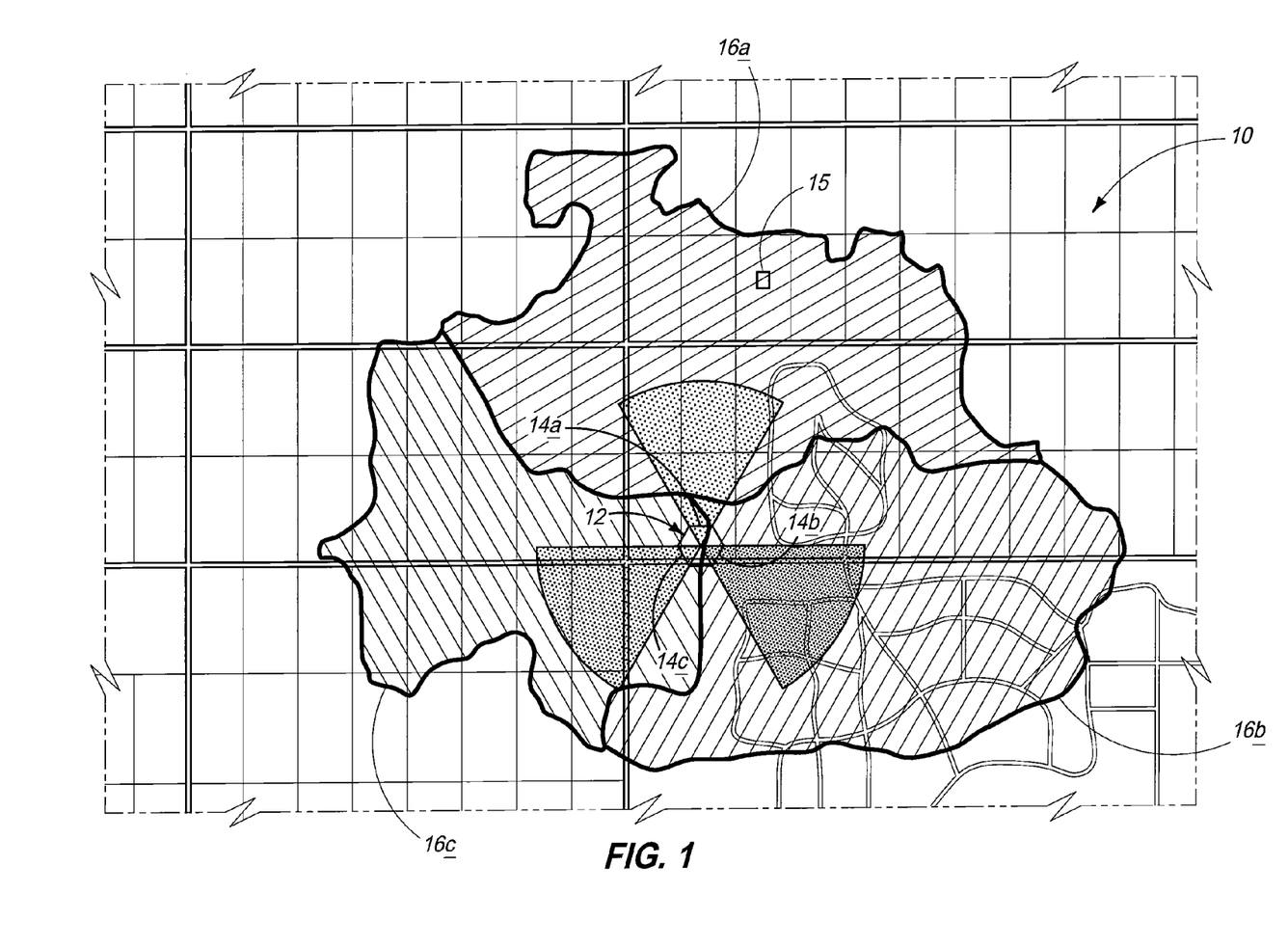
FIG. 1 is an illustrative representation of a geographical regions which are serviced by a plurality of base stations of a wireless communications network according to one embodiment.

Referring to FIG. 1, a map of an example geographic area is shown. FIG. 1 shows a base station 12 of a wireless communications system or network 10, such as a cellular communications network. The illustrated base station 12 comprises a plurality of fixed-position communications sources, such as sectors 14*a*-14*c*, which individually implement wireless (e.g., radio frequency) communications with respect to a plurality of mobile communications devices 15. One example mobile communications device 15 is shown in FIG. 1 although numerous mobile communications devices may be communicating with a given sector 14 of a base station 12 at a given moment in time. Furthermore, the system may also include additional base stations 12 to provide wireless communications with respect to different geographic areas. The sectors 14a-14c are configured to wirelessly communicate with mobile communications devices which are located in respective different geographic regions 16a-c, such as cells in a cellular communications implementation.

The wireless communications network 10 may experience dynamic changes over time. For example, mobile communications devices 15 may move throughout different geographic regions 16a-16c, and accordingly, the communications of the devices 15 may pass from one sector 14a-14c to another, or perhaps between different sectors of different base stations 12, using hand-off operations.

Furthermore, the geographic regions 16 covered by respective sectors 14 may also dynamically change over time. For example, additional base stations 12 may be added which may result in changes to sectors 14 of existing base stations 12 (e.g., moving antenna directions of the sectors 14, adjusting transmission powers of the sectors 14, etc.). The sectors 16 may also be influenced by environmental conditions (e.g., geography, buildings, etc.). Accordingly, a change within the environment (e.g., construction of a new building) may also result in changes of one or more of the geographic regions 16 which are serviced by the sectors 14 where the environmental change occurred.

Aspects of the present disclosure are directed towards determining wireless coverage representations which associate wireless service of sectors 14a-14c with different geographic locations. One example wireless coverage representation is a footprint map which indicates the most likely sector 14 which a mobile communications device 15 will communicate with when positioned at a certain geographic location. The wireless coverage representations may be utilized for different purposes or in different applications and may be calculated at different moments in time to accurately characterize the wireless communications network 10 due to the dynamic nature of the wireless communications network 10. As mentioned above, the geographic regions 16 served by respective sectors 14 may change over time due to various factors. At least some aspects of the disclosure are directed towards facilitating the calculation of the wireless coverage representations at moments in time of interest as well as providing different uses of the wireless coverage representations.

As discussed below, the timing of the generation of the wireless coverage representations and/or the specific geographic areas included within the wireless coverage representations may be important for some uses of the wireless coverage representations. At least some of the aspects of the present disclosure are directed towards generating wireless coverage representations at specific times or time periods of interest as well as covering one or more specific geographic location or area of interest. Since the geographic regions 16 served by respective sectors 14 may dynamically change, some aspects of the disclosure are useful to provide snapshots of the wireless coverage representations at desired moments in time.

According to some aspects, the generated wireless coverage representations may also be utilized with wireless communications records (e.g., cellular communications records) of the network 10 in some of the applications. For example, the wireless coverage representations may be used with analysis of records of a mobile communications device of interest, or perhaps identifying the presence of mobile communications devices in a geographic area of interest with the aim of locating a suspect associated with one of the mobile communications devices as described in additional detail below.

More specifically, the wireless coverage representations may be used by law enforcement agencies for forensic investigation and solving crimes. Furthermore, the wireless coverage representations and/or wireless communications records may be utilized as evidence in criminal proceedings to prove (or exonerate) a suspect with respect to the crime. The evidence may also be used for other purposes, for example, in civil proceedings or for other uses, for example verifying services pursuant to a wireless carrier service contract, identifying a wireless carrier with the most robust coverage in a certain geographic area, for uses with respect to regulation of the wireless communications, or for other purposes where there may be one or more of a geographic location of interest, a time period of interest, and/or a mobile communications device of interest.

Figure 2:
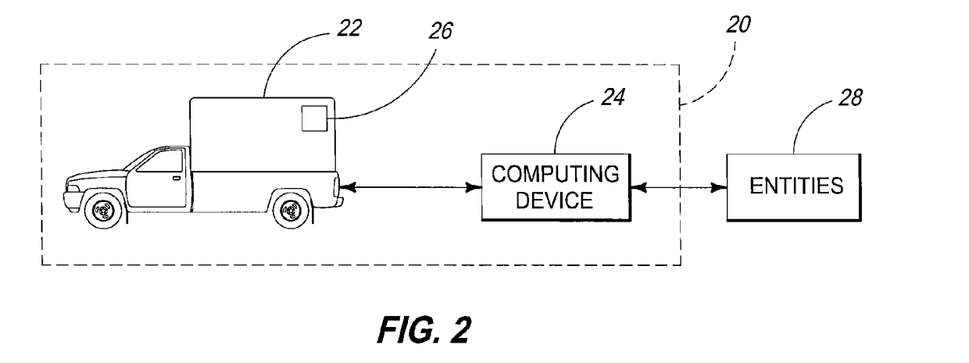
FIG. 2 is a functional block diagram of an analysis system for analyzing wireless communications signals according to one embodiment.

Referring to FIG. 2, an analysis system 20 is shown which may be utilized to measure one or more parameter of a wireless communications network 10 and process the measurements. The illustrated system 20 includes a mobile vehicle 22 and a computing device 24. Other implementations of the analysis system 20 are possible.

As mentioned above, it may be desired for one of a variety of purposes to determine the wireless coverage representations of one or more wireless communications networks (e.g., wireless carriers) 10 within a geographical area of interest at a time period of interest. For example, as a result of the commission of a crime, it may be desirable to analyze one or more wireless communications networks (perhaps associated with different wireless carriers) in the geographic location where the crime was committed including measuring and collecting data regarding wireless communications of the wireless communications networks as quickly as possible after a crime was committed (or with respect to another time period of interest in other applications) to preserve evidence and before changes occur with respect to the geographic regions 16 which are serviced by respective sectors 14. Accordingly, in one embodiment, the mobile vehicle 22 may be part of a law enforcement agency, contractor or other entity and may be equipped to respond quickly when a crime occurs to establish wireless coverage representations in the vicinity of the geographic location of the crime prior to changes in the networks or wireless coverages. The collected data may be preserved for subsequent analysis operations, for example, processing of the data to provide wireless coverage representations of the wireless communications networks.

More specifically, when a law enforcement agency becomes aware of a crime, the agency may secure the crime location as a normal part of their investigation. With the ubiquitous and increasing uses of wireless communications devices in everyday life, it may be advantageous for agencies to be prepared to rapidly deploy the mobile vehicle 22 to analyze the applicable wireless communications networks as part of their criminal investigation. Accordingly, the law enforcement agency may have the mobile vehicle 22 on-call and which is prepared for use upon relatively short notice. In one example, an agency may deploy the vehicle 22 to the geographic location of interest as part of their routine criminal investigation procedures.

Accordingly, at least some aspects of the disclosure are directed towards facilitating the analysis of one or more wireless communications networks 10. For example, the mobile vehicle 22 may be deployed as soon as possible to a geographic area which includes a geographic location of interest (e.g., where a crime was committed) and which may be referred to as a geographic area of interest. Once present in the geographic area of interest, an operator of the vehicle may enable wireless communications analysis equipment 26 to begin analysis (e.g., measurement or collection) of wireless communications signals received by the equipment at the location of the mobile vehicle 22.

In one example, the operator may set the equipment 26 in a state to begin recording one or more parameters (e.g., intensity, frequency, phase, signal/source identifier, etc.) of wireless communications signals received at the mobile vehicle 22. Following the enablement of the equipment 26, the operator may thereafter drive the mobile vehicle 22 within the vicinity of the geographic area of interest and the equipment may automatically measure and record the parameter(s) of the wireless communications signals as the operator drives the vehicle 22. In one embodiment, the equipment may measure the signals and generate measurement data indicative of the measurements without further input of the operator with respect to the analysis operations and who may focus on driving or other tasks at hand such as observing the area for additional possible evidence. Accordingly, the data acquisition with respect to the wireless communications signals is facilitated in at least one embodiment permitting operation of the mobile vehicle 22 by an operator who may have little or no training with respect to wireless communications and who may be free to focus on other tasks at hand, such as maneuvering the vehicle within the vicinity of interest, performing other investigation functions, observing the vicinity of the crime scene, etc.

Aspects of the present disclosure may be utilized to analyze different wireless communications networks in a common geographic area. For example, a plurality of different wireless carriers may serve a common geographic area and the wireless carriers may utilize their own respective network infrastructures (e.g., base stations) for communications within respective different portions of the electromagnetic spectrum. The analysis operations of the mobile vehicle 22 may be performed with respect to a single wireless carrier or for a plurality of wireless carriers wherein the wireless communications signals of different wireless carriers may be simultaneously measured.

The measurement of the wireless communications signals results in the generation of measurement data (e.g., data which are indicative of the parameters of the wireless communications signals measured at different geographic locations). The measurement data may be recorded and stored as well as processed to generate one or more wireless coverage representations for one or more wireless carriers, respectively.

In one embodiment, the analysis equipment 26 of the mobile vehicle 22 includes the equipment for generating the measurement data (e.g., intensities of the signals) as well as storage for storing the measurement data. Other circuitry may be utilized to process the measurement data to provide the wireless coverage representations for the sectors for which measurements were made. For example, as illustrated in FIG. 2 in one embodiment, the computing device 24 may be remotely located from the mobile vehicle 22 and include communications circuitry for receiving the measurement data from the mobile vehicle 22. In another example, the computing device 24 may be embedded within the vehicle 22. Any suitable arrangement for measuring wireless signals and processing the measured data may be used, and accordingly, other implementations are possible.

The measurement data may be communicated to computing device 24 in real time during data acquisition, after storage of the measurement data and return of the mobile vehicle 22 to a law enforcement facility, or at another appropriate time. Furthermore, the computing device 24 may also be located on-premise at a law enforcement entity, within the vehicle 22 itself or at any other desired location for a particular application. Furthermore, the above embodiments are examples of data acquisition and processing and other methods and apparatus are possible.

The analysis system 20 may provide the calculated wireless coverage representations to one or more appropriate entity 28. For example, the wireless coverage representations may be provided to a law enforcement agency, potential purchasers of wireless communications services, agencies which regulate wireless communications, wireless communications networks themselves or other parties which may have interest in the wireless coverage representations.

In some arrangements, the measurement data and/or wireless coverage representations may be stored for a period of time prior to use as evidence, investigation or other purposes. As mentioned herein, it may be desirable to measure the wireless communications signals proximate to the geographic location of interest during a time period of interest (e.g., before the coverage of sectors servicing the vicinity of the geographic location of interest change). Once the measurement data have been captured and preserved, the data may be stored and retrieved at a later date and for example used to generate a wireless coverage representation which indicates one or more sectors which provide wireless communications with respect to a geographic location of interest.

Figure 3:
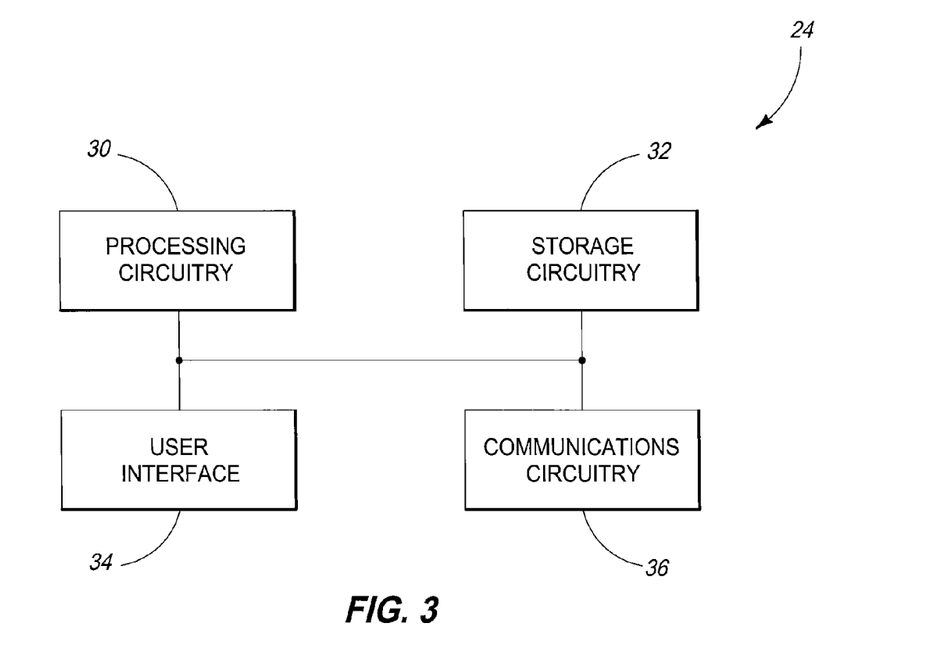
FIG. 3 is a functional block diagram of a computing device according to one embodiment.

Referring to FIG. 3, one example of a computing device 24 is shown. In the illustrated embodiment, the computing device 24 includes processing circuitry 30, storage circuitry 32, a user interface 34, and communications circuitry 36. In one embodiment, the computing device 24 may be a server which is configured to communicate with and receive measurement data from mobile vehicle 22, for example, via a secured connection over the internet. Other embodiments are possible including more, less and/or alternative components. Furthermore, analysis equipment and other components of the mobile vehicle 22 may be similarly configured as the below-described components of the computing device 24 with additional circuitry for measuring and generating measurement data regarding the wireless communications signals being analyzed.

The measurement data may be uploaded to computing device 24 which is a FTP server in one example configuration. The server may analyze the measurement data and generate the wireless coverage representations which may thereafter be accessed by an entity 28 via the Internet. The entity 28 may utilize a web browser to gain access to reports (e.g., wireless coverage representations) of interest. The wireless coverage representations may be used to investigate a crime, as evidence in criminal or civil proceedings or perhaps correlated with other relevant information to produce meaningful reports.

In one embodiment, processing circuitry 30 is arranged to process data, control data access and storage, issue commands, and control other desired operations. For example, the processing circuitry 30 may process the measurement data to provide the wireless coverage representations in one embodiment. Processing circuitry 30 may comprise circuitry configured to implement desired programming provided by appropriate computer-readable storage media in at least one embodiment. For example, the processing circuitry 30 may be implemented as one or more processor(s) and/or other structure configured to execute executable instructions including, for example, software and/or firmware instructions. Other exemplary embodiments of processing circuitry 30 include hardware logic, PGA, FPGA, ASIC, state machines, and/or other structures alone or in combination with one or more processor(s). These examples of processing circuitry 30 are for illustration and other configurations are possible.

Storage circuitry 32 is configured to store programming such as executable code or instructions (e.g., software and/or firmware), electronic data, acquired measurement data, wireless coverage representations, databases, or other digital information and may include computer-readable storage media. At least some embodiments or aspects described herein may be implemented using programming stored within one or more computer-readable storage medium of storage circuitry 32 and configured to control appropriate processing circuitry 30.

The computer-readable storage medium may be embodied in one or more articles of manufacture which can contain, store, or maintain programming, data and/or digital information for use by or in connection with an instruction execution system including processing circuitry 30 in the exemplary embodiment. For example, exemplary computer-readable storage media may be non-transitory and include any one of physical media such as electronic, magnetic, optical, electromagnetic, infrared or semiconductor media. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

User interface 34 is configured to interact with a user including conveying data to a user (e.g., displaying visual images for observation by the user) as well as receiving inputs from the user. User interface 34 is configured as graphical user interface (GUI) in one embodiment. User interface 34 may be configured differently in other embodiments. An analyst may implement or monitor the processing of the measurement data and the generation of the wireless coverage representations in one embodiment.

Communications circuitry 36 is arranged to implement communications of computing device 24 with respect to external circuitry (e.g., communications circuitry of the mobile vehicle 22). For example, communications interface 36 may be arranged to communicate information bi-directionally with respect to computing system 10. Communications interface 36 may be implemented as a network interface card (NIC), serial or parallel connection, USB port, Firewire interface, flash memory interface, wireless communications circuitry, or any other suitable arrangement for implementing communications of computing device 24 with respect to external devices.

Figure 4:
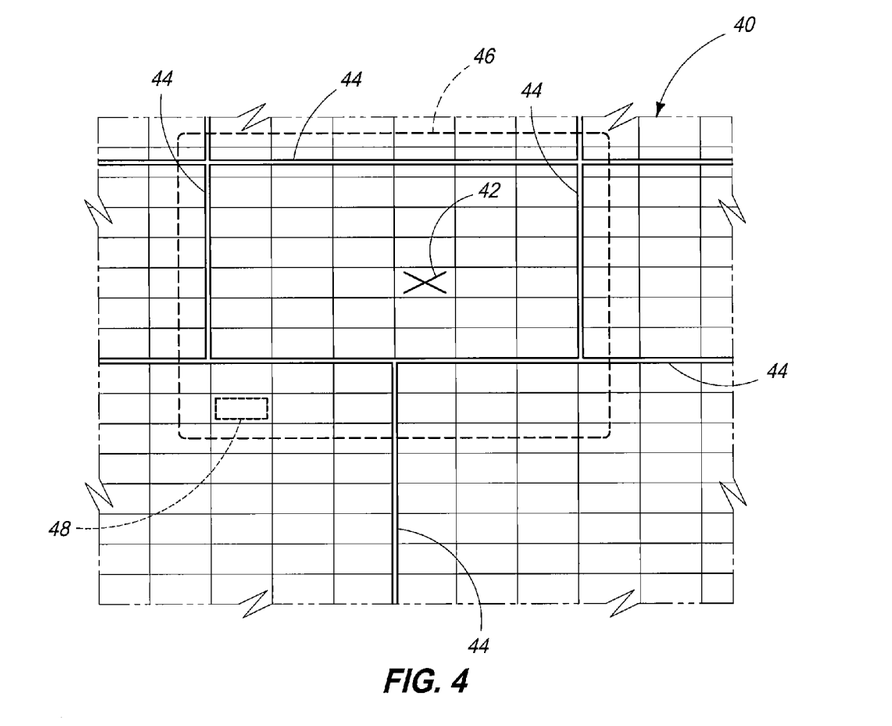
FIG. 4 is an illustrative representation of analysis operations with respect to a geographic location of interest according to one embodiment.

Referring to FIG. 4, additional details are described with respect to analyzing wireless communications signals with respect to a geographic location of interest 42 and generation of wireless coverage representations with respect thereto. A geographic location of interest 42 may vary depending upon circumstances, uses or applications. For example, a geographic location of interest 42 may include a residence, city block, defined area of land in rural country, etc.

The wireless communications signals may be measured within a geographic area of interest 46 which includes the geographic location of interest 42. The geographic area of interest 46 may correspond in one embodiment to an area wherein sufficient data may be acquired to accurately generate wireless coverage representations for sectors of a wireless communications network with respect to the geographic location of interest. The size of the geographic area 46 may vary in different circumstances (e.g., urban versus rural environments of the geographic location of interest 42). In one illustrative example, if a crime was committed at a residence, the geographic location of interest 42 may be the residence and the geographic area of interest 46 may include a block which includes the residence as well as one or more blocks of residences which are immediately adjacent to the block which includes the residence.

For illustrative purposes described hereafter, a crime has occurred at the geographic location of interest 42. In the example of FIG. 4, a plurality of roads 44 are in the vicinity of the geographic location of interest 42. The operator of the mobile vehicle 22 may drive the vehicle along the roads 44 which are in the vicinity of the geographic location of interest 42 (i.e., roads 44 within the geographic area of interest 46) with the wireless communications analysis equipment thereof enabled. These analysis operations will provide measurement data regarding the received wireless communications signals received from one or more sectors along the roads 44. However, there may be relatively large portions of the geographic area of interest 46 without roads 44 or are otherwise not easily accessible to directly measure the wireless communications signals of the sector(s).

In one embodiment, interpolation may be utilized to provide information in portions of the geographic area of interest 46 where direct measurements of the wireless communications signals were not obtained or available. In one example, a plurality of bins 48 of common dimensions may be defined within the geographic area of interest 46. Bins 48 may have different dimensions based upon the geography of the geographic area of interest 46 (e.g., the bins of an urban area may be smaller than bins in rural areas in one example).

The measured data may be provided for the bins 48 which correspond to the roads 44. For a given bin 48, a plurality of measurements may be provided for respective wireless communications signals received from different sources or sectors at the location of the bin 48. In one embodiment, the analysis equipment may associate each parameter measurement with a specific identifier, frequency, phase or other parameter for use in interpolating the appropriate measurement data from respective sectors as well as identifying the sector of the wireless communications signals to which the measurement data corresponds.

As shown in FIG. 4, numerous bins 48 exist in the geographic area of interest 46 without corresponding roads 44 or measurements. As discussed above, interpolation of actual measured results along roads 44 (or otherwise directly measured by the analysis equipment) may be used to determine measurement data of the wireless communications signals for the bins 48 where no direct measurements were obtained. Different methods (e.g., natural neighbor, rectangular, triangular, inverse distance weighting) may be used to interpolate the measured data in one embodiment. Accordingly, in one data processing example, measurement data may be provided for each of the bins 48 including directly measured data or data resulting from interpolated measurement data.

In one embodiment, computer modeling may also be used to implement interpolation operations. For example, computer modeling may take into account terrain, structures, etc. and which be used along with interpolation of the measured data to provide interpolated results of increased accuracy.

Following the interpolation of the data for all the appropriate bins 48 for the different respective sectors, wireless coverage representations in the form of surface coverage maps or plots may be constructed for each of the sectors. As discussed above, one example parameter which may be measured is a characteristic of the wireless communications signals, such as intensity, and the intensity data for a given sector may be included in the bins 48 of the surface coverage map or plot for the respective sector. Other example parameters may include carrier to interference ratio, signal to noise ratio, service cell ID, serving cell color codes or any other parameter available on the air interface of the wireless communications network.

Accordingly, a surface coverage map or plot is one example of a wireless coverage representation which associates the intensities of wireless communications signals emitted from a common sector at a plurality of geographic locations. Other wireless coverage representations may be generated. Another example of a wireless coverage representation is a footprint map which indicates which sectors a mobile communications device is most likely to communicate with at respective geographic locations.

In one embodiment, a footprint map may be generated for each wireless carrier for a given geographic area of interest. The footprint map, for a given wireless carrier, identifies a single sector of the respective carrier for a respective bin 48 and which indicates the sector which a mobile communications device is most likely to communicate with when the device is located at the respective bin 48 although a plurality of wireless communications signals from different sectors of the wireless carrier may be received at the bin 48. In one example, a sector of the respective wireless carrier providing a wireless communications signal having the greatest calculated or measured intensity at the bin 48 will be associated with the bin 48. Other wireless coverage representations may be generated and utilized in other embodiments.

Additional aspects are contemplated with respect to generation of footprint maps of respective sectors. For example, the coverage regions of individual sectors may be limited by requiring that signals within the coverage region have at least a minimum signal strength. Furthermore, the footprint map of an individual sector may be enlarged by adding a buffer region around a sector to include bins in which the individual sector is the second or third best sector of communications. This helps to account for the fact that mobile communications devices are not necessarily always connected to the strongest sector, especially just before a mobile communication is handed off from one sector to another sector. The buffer region may be further enhanced by limiting the buffer region using actual handoff neighbor lists used by the network, handoff delta margins, error margins, etc.

Illustrative examples are discussed below with respect to possible uses of calculated wireless coverage representations in the investigation of crimes. According to some embodiments, the calculated wireless coverage representations may be used with communications records (e.g., cellular call data records) to generate evidence to support the guilt of a suspect or exonerate a suspect.

For example, the time period at which a crime was committed may be known and provide a time period of interest (e.g., a time period immediately before, during and immediately after the commission of the crime). As discussed above, the wireless communications signals may be measured within or close to the time period of interest. However, the time of crimes are not typically known before they occur. The time period of interest refers to a period of time where useful information regarding wireless communications may be relevant to the crime or other event or useful for other purposes. In one crime analysis example, it may be most beneficial to measure the wireless communications in the geographic area of interest as discussed above as soon as the authorities are aware of the commission of the crime and before any changes are implemented with respect to the wireless communications network. Accordingly, in some crime investigations, the measurement data of wireless communications signals may be captured sufficiently close in time to the commission of the crime to accurately reflect the wireless communications of the wireless communications networks when the crime occurred (e.g., before modifications to the wireless communications network).

Using the wireless coverage representations generated by the measurement data, one or more sectors of interest may be identified which implement wireless communications with respect to geographic locations which include the geographic location of interest or and geographic locations proximate thereto within a time of interest. Since some sectors may overlap to some degree, there may be more than one sector of interest with respect to a given geographic location of interest (e.g., sectors corresponding to geographic locations proximate to the geographic location of interest). The wireless coverage representations including footprint maps and/or surface coverage maps may be utilized to identify the sectors of interest given the geographic location of interest.

Some wireless communications networks maintain information regarding previous wireless communications. For example, cellular wireless communications networks may maintain call data records which include information regarding identifiers of communicating mobile communications devices as well as identifiers of respective sectors of the wireless communications network which are communicating with the mobile communications devices at respective moments in time. These records may indicate this information regardless of whether the mobile communications devices are actively participating in wireless communications with other mobile communications devices as the mobile communications devices may be registered with the sectors during their presence within the geographical regions serviced by the sectors and may be stored for billing or other purposes. While a sector implementing communications with a mobile communications device is known, the call data records do not have information regarding the actual location of the device in the coverage area of the sector, but rather it is known that the device is somewhere within the coverage area of the sector.

In one embodiment, information regarding one or more sectors of interest and call data records may be utilized for investigation of a crime, generation of evidence with respect to the crime, or for other purposes. For example, an entity of interest (e.g., individual, organization, business, etc.) may be known and may be considered as a suspect with respect to the commission of the crime, perhaps from investigation of other leads, being related to a victim of a crime, etc. The entity of interest may have a mobile communications device associated with an account with one of a plurality of wireless carriers. Accordingly, wireless communications networks may be requested by an investigator whether they have an account for the entity of interest. If it is determined that an entity of interest does have an account and an associated mobile communications device with a given network of a wireless carrier, the call data records of the entity of interest of the appropriate wireless carrier may be searched to determine whether there are relevant records. For example, records of wireless communications of a mobile communications device which is associated with the entity of interest (which may be referred to as a mobile communications device of interest) with a sector of interest during the time period of interest may be useful evidence with respect to the guilt of the suspect. These records may be used as evidence to demonstrate that an individual of interest was or was not involved with the commission of a crime depending upon the stored call data records.

In another example where an entity or mobile communications device of interest is not known, a law enforcement agency may have information regarding a time period of interest (e.g., when the crime was committed). The sectors of interest which include the geographic location of interest may be used to search call data records to identify a list of mobile communications devices which were present in geographical locations serviced by the sectors of interest during the time period of interest. This list of devices may be used to perhaps identify possible suspects or generate additional leads for further investigation.

Additional aspects are also possible to increase the accuracy or reliability of the resulting evidence. While the mobile communications device is participating in a phone call, the mobile communications device may measure the signal strength of the sector facilitating the communication as well as neighboring sectors. This set of measurements may be used to determine the location of the device within the footprint map of the serving sector by finding bins within the footprint of the serving sector having interpolated or measured values of the neighboring sectors that match or are within an acceptable range of the neighboring sector measurements reported by the mobile communications device.

A similar method may be used for uplink measurements. In this similar method, the base stations of the network (including the serving sector and neighboring sectors) may measure the signal strength of the mobile communications device while the mobile communications device is participating in a communication. This set of measurements may be used to determine the location of the mobile communications device within the footprint of the serving sector by finding bins within the footprint of the serving sector having interpolated or measured uplink values of the neighboring sectors that match or are within an acceptable range of the neighboring sector uplink measurements recorded by the base stations.

These examples are illustrative of possible uses of generated wireless coverage representations with respect to investigations or generating evidence with respect to crimes. However, there are numerous other possible uses of the wireless coverage representations which may be associated with time periods of interest and/or geographic locations of interest.

In one example, the wireless coverage representations may be utilized to determine which wireless communications network provides the best coverage with respect to a geographical location of interest for the purpose of determining which wireless communications network (wireless carrier) a potential customer or entity should subscribe to. For example, for a company purchasing numerous mobile communications devices for employees, it may be desirous to identify which wireless communications network provides the best coverage at the geographical location of the company.

In another example, an agency which governs use of the electromagnetic spectrum may grant a wireless communications network rights in a certain geographical location and/or with respect to a portion of the radio frequency spectrum and may use the wireless coverage representations to determine whether the wireless communications network is utilizing the granted rights, to verify a build out, for interference management, or for other purposes.

In yet another example, a wireless communications network may enter into contracts (e.g., Service-Level Agreements) which specify the wireless communications they are to provide and the other contracting parties may utilize the wireless coverage representations to determine whether the contractual obligations are being met.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A crime investigation method comprising:
   receiving information regarding a commission of a crime at a time period of interest and at a geographic location of interest;
   after the receiving and using wireless communications analysis equipment of a mobile vehicle, measuring cellular signals in a geographic area which includes the geographic location of interest during the time period of interest;
   as a result of the measuring, generating measurement data which is indicative of a parameter of the cellular signals in the geographic area;
   using the measurement data, calculating a footprint map which identifies one of a plurality of communications sources which a mobile communications device is most likely to communicate with when the mobile communications device is located at a plurality of geographic locations within the geographic area during the time period of interest;
   accessing cellular communications records which are indicative of communications of the mobile communications device via the cellular signals in the geographic area during the time period of interest; and
   using the cellular communications records and the footprint map, providing information regarding the crime including a presence of the mobile communications device within the geographic area during the time period of interest.

2. The method of claim 1 further comprising, using the footprint map, identifying the one communications source comprising a sector of interest of a cellular communications network.

3. The method of claim 2 wherein the providing information comprises providing information indicating that the mobile communications device communicated with the sector of interest during the time period of interest.

4. The method of claim 3 further comprising using the information as evidence that an entity associated with the mobile communications device was involved with the commission of the crime.

5. The method of claim 2 wherein the providing information comprises providing a list of mobile communications devices which communicated with the sector of interest during the time period of interest.

6. The method of claim 5 further comprising using the list of mobile communications devices to identify possible suspects who may have been involved with the commission of the crime.

7. The method of claim 1 wherein the measuring cellular signals comprises, after the receiving information regarding the commission of the crime, enabling the wireless communications analysis equipment to automatically measure the cellular signals without additional user input and moving the enabled wireless communications analysis equipment throughout the geographic area.

8. The method of claim 1 further comprising identifying the mobile communications device as being a device of interest without use of the cellular communications records, and wherein the accessing comprises accessing cellular communications records associated with the mobile communications device of interest during the time period of interest as a result of the identifying.

9. The method of claim 1 wherein the providing information comprises providing evidence regarding an entity associated with the mobile communications device with respect to the geographic area during the time period of interest.

10. The method of claim 1 further comprising processing the measurement data to identify a geographic location of the mobile communications device within the geographic area.

11. The method of claim 1 wherein the calculating the footprint map comprises excluding geographic locations from the footprint map as a result of the cellular signals measured at the excluded geographic locations not having a minimum signal strength.

12. The method of claim 1 wherein the footprint map includes a plurality of initial geographic locations of the geographic area at which the mobile communications device is most likely to communicate with the one communications source, and further comprising enlarging the footprint map to include a plurality of additional geographic locations at which the mobile communications device is not most likely to communicate with the one communications source.

13. An evidence generation method comprising:
identifying a geographic location of interest;
identifying a time period of interest;
using wireless communications analysis equipment of a mobile vehicle and during the time period of interest, measuring wireless communications signals emitted from at least one fixed-position wireless communications source of a wireless communications network in a geographic area which includes the geographic location of interest;
as a result of the measuring, generating measurement data which is indicative of a parameter of the wireless communications signals in the geographic area during the time period of interest;
using the measurement data, generating a footprint map which identifies the at least one fixed-position wireless communications source as a source which a mobile communications device is most likely to communicate with when the mobile communications device is located at a plurality of geographic locations within the geographic area during the time period of interest; and
using the footprint map as evidence to indicate a presence of the mobile communications device within the geographic area during the time period of interest.

14. The method of claim 13 wherein the geographic location of interest corresponds to a geographic location where a crime was committed and the time period of interest corresponds to a time period when the crime was committed, and wherein the using the footprint map as evidence comprises using the footprint map to demonstrate whether the mobile communications device communicated with the at least one fixed-positioned wireless communications source during the time period of interest.

15. The method of claim 13 wherein the measuring comprises:
enabling the wireless communications analysis equipment to measure the wireless communications signals;
with the wireless communications analysis equipment enabled, driving the mobile vehicle through the geographic area; and
automatically measuring the wireless communications signals at different locations in the geographic area during the driving in the absence of user input with respect to the enabled wireless communications analysis equipment.

16. The method of claim 15 further comprising communicating the measurement data from the vehicle to a remote computing device, and wherein the generating the footprint map comprises generating using the remote computing device.

17. The method of claim 13 further comprising:
after the measuring, storing at least one of the measurement data and the footprint map for a period of time; and
after passage of the period of time, receiving a request with respect to the footprint map, and wherein the using comprises using as a result of the receiving the request.

18. The method of claim 13 wherein the generating the footprint map comprises excluding geographic locations from the footprint map as a result of the wireless communications signals measured at the excluded geographic locations not having a minimum signal strength.

19. The method of claim 13 wherein the footprint map includes a plurality of initial geographic locations of the geographic area at which the mobile communications device is most likely to communicate with the at least one fixed-position wireless communications source, and further comprising enlarging the footprint map to include a plurality of additional geographic locations at which the mobile communications device is not most likely to communicate with the at least one fixed-position wireless communications source.

20. A wireless communications system analysis method comprising:
identifying a geographic area of interest to analyze wireless communications of a wireless communications system;
during a time period of interest, enabling wireless communications analysis equipment of a mobile vehicle;
during the time period of interest, moving the mobile vehicle and the enabled wireless communications analysis equipment throughout the geographic area of interest to analyze the wireless communications system;
during the moving, measuring wireless communications signals emitted from a plurality of fixed-position communications sources of the wireless communications system at different geographic locations within the geographic area of interest;
as a result of the measuring, generating measurement data which is indicative of a parameter of the wireless communications signals at the different geographic locations within the geographic area of interest during the time period of interest;
communicating the measurement data to a remote computing device; and
using the remote computing device, generating a footprint map which identifies one of the fixed-position communications sources which a mobile communications device is most likely to communicate with when the mobile communications device is located at selected ones of the different geographic locations during the time period of interest.

21. The method of claim 20 wherein the measuring comprises automatically measuring the wireless communications signals during the moving using the enabled wireless communications analysis equipment in the absence of user input with respect to the enabled wireless communications analysis equipment.

22. The method of claim 20 wherein the generating the footprint map comprises excluding at least some of the geographic locations from the footprint map as a result of the wireless communications signals measured at the excluded geographic locations from the one fixed-position communications source not having a minimum signal strength.

23. The method of claim 20 wherein the footprint map includes a plurality of initial ones of the geographic locations at which the mobile communications device is most likely to communicate with the one fixed-position communications source, and further comprising enlarging the footprint map to include a plurality of additional geographic locations at which the mobile communications device is not most likely to communicate with the one fixed-position communications source.

* * * * *